US007987698B2

(12) United States Patent
Nakano et al.

(10) Patent No.: US 7,987,698 B2
(45) Date of Patent: Aug. 2, 2011

(54) GAS LEAK DETECTION APPARATUS AND METHOD

(75) Inventors: Kenji Nakano, Kodaira (JP); Yoshito Sameda, Yokohama (JP); Yukio Takanohashi, Hachioji (JP); Hiroto Uyama, Tokyo (JP); Masaaki Ishino, Machida (JP)

(73) Assignee: Toshiba Toko Meter Systems Co., Ltd., Tokyo (JP)

( * ) Notice: Subject to any disclaimer, the term of this patent is extended or adjusted under 35 U.S.C. 154(b) by 490 days.

(21) Appl. No.: 12/169,394

(22) Filed: Jul. 8, 2008

(65) Prior Publication Data

US 2009/0013765 A1 Jan. 15, 2009

(30) Foreign Application Priority Data

Jul. 9, 2007 (JP) ................................ 2007-180069

(51) Int. Cl.
*G01M 3/28* (2006.01)

(52) U.S. Cl. ...................................... 73/40.5 R; 73/49.1

(58) Field of Classification Search ............... 73/40.5 R, 73/49.1

See application file for complete search history.

(56) References Cited

U.S. PATENT DOCUMENTS 4,012,944 A 3/1977 Covington et al.
4,091,658 A 5/1978 Covington et al.
4,144,743 A 3/1979 Covington et al.
7,552,622 B2 * 6/2009 Speranza ................... 73/40.5 R
2006/0174707 A1 * 8/2006 Zhang ............................ 73/592

FOREIGN PATENT DOCUMENTS

JP 51-68885 6/1976
JP 2003-149075 5/2003
JP 2004-150071 5/2004

* cited by examiner

*Primary Examiner* — Hezron Williams
*Assistant Examiner* — Paul West
(74) *Attorney, Agent, or Firm* — Oblon, Spivak, McClelland, Maier & Neustadt, L.L.P.

(57) ABSTRACT

According to the present invention, mistaken detection of a gas leak can be prevented even when using an appliance which has been newly installed in a dwelling receiving a gas supply, and whereby a gas leak can be detected rapidly, efficiently and accurately. The characteristics extraction means 5 extracts characteristics of a gas flow including a combination of the instantaneous flow volume data and the instantaneous flow volume time differential value, on the basis of the data obtained by the flow volume measurement means 1, pressure measurement means 2, instantaneous flow volume time differential operation means 3 and pressure time differential operation means 4. The leak detection means 7 compares the characteristics data for respective types of gas appliance or for a gas leak registered in the storage means 6 with the characteristics extracted by the characteristics extraction means 5, and if a matching is not achieved, further judges whether there is a flow volume variation or nozzle variation, and whereby it judges whether there is a gas leak or whether an unregistered appliance is in use. If occurrence of a gas leak, the warning means 9 issues a warning. If an unregistered appliance is in use, the characteristics data forming the basis of the judgment is registered as a new characteristics data in the storage means 6 by the characteristics data registration means 8.

13 Claims, 6 Drawing Sheets

| RULE NO. | LENGTH DIVISION | INITIAL FLOW VOLUME | TRANSITED REGION 1 | TRANSITED REGION 2 | ... | LAST MATCHING | FREQUENCY |
|---|---|---|---|---|---|---|---|
| 1 | 5 | 0 | 151 | 152 | ... | 10 | 234 |
| 2 | 7 | 400 | 151 | 152 | ... | 120 | 1 |
| 3 | 6 | 120 | 155 | 156 | ... | 42 | 3 |
| ... | ... | ... | ... | ... | ... | ... | ... |

GAS LEAK DETECTION APPARATUS AND METHOD

BACKGROUND OF THE INVENTION

1. Field of the Invention

The present invention relates to a gas leak detection apparatus and detection method used in a gas meter or the like which is disposed in a gas supply line to a domestic dwelling and has a gas flow meter, and more particularly it relates to technology which enables the provision of higher advanced safety functions and services by detecting the presence of a gas leak during occurrence and continuation of the flow volume by a gas supply.

2. Description of the Related Art

A gas meter incorporating a gas flow meter is installed at the inlet port of the gas supply line to a domestic dwelling. The gas meter measures the gas flow volume passing through the gas supply line, and the measured gas flow volume is used to calculate a periodic gas billing amount. In addition to basic functions, such as measuring the gas flow volume, the gas meter also has a safety function for shutting off the gas supply when an abnormal state occurs. This safety function is a function which shuts off the gas by means of a shut-off valve provided in the gas flow path of the gas meter, in response to the detection of an abnormal usage state, for instance, if an earthquake is detected, if there is a gas leak or if the appliance is left without turned off, and the like.

FIG. 7 is a diagram showing the safe continuous use time settings employed in a shut-off function in the event that the safe continuous use time has been exceeded, which is one of the safety functions described above. This function is a function whereby, in cases where the occurrence of a gas flow has been detected and the gas flow is used continuously thereafter, then if the continuous use time has become excessively long, it is considered that an abnormal usage state of some kind, such as a gas leak, has occurred, and hence the gas is shut off.

As shown in FIG. 7, a large-scale water boiler which uses a large gas flow volume is only used continuously for approximately 30 minutes, whereas a stove which uses a small gas flow volume may be used continuously for a long period of time, and therefore based on this premise, the safe continuous use time is set to a short time when the gas flow volume is large and the safe continuous use time is set to a long time when the gas flow volume is small.

The gas meter judges that a gas appliance of some kind has started to be used, when a gas flow volume has occurred and or when the gas flow volume has changed into an increase, and based on this judgement, measures the time during which this flow rate continues. If this flow volume continues for a time exceeding the safe continuous use time shown in FIG. 7, then the gas meter shuts off the gas for safety reasons. Consequently, rather than identifying the gas appliance in use, a shut-off due to over-run of the safe continuous use time is implemented, on the basis of the used gas flow volume.

However, as shown in FIG. 7, a technique which measures the use time and compares same with a safe continuous use time is problematic in that it takes a long time to shut off the gas, even in the event of a gas leak.

On the other hand, in the prior art, a technique has also been proposed in which a gas leak is judged by comparison with patterns of flow volume change under reduced pressure or flow volume values measured in the past (see, for example, Japanese Patent Application Publication No. 2005-331373. However, even if a technique such as this is used, since a state of no change in the flow volume range or pattern continues both in the case of a gas leak and in the case of continuous use of a gas appliance which is not fitted with a governor (pressure regulator), such as cooking stove, then it has been difficult to distinguish between these two cases. In particular, when using an appliance which has been newly installed in a dwelling receiving a gas supply, since there is no data for comparison in relation to that appliance, then there has been a possibility of a gas leak being detected mistakenly.

SUMMARY OF THE INVENTION

The present invention was devised in order to resolve the problems of the prior art described above, an object thereof being to provide a gas leak detection apparatus and method whereby a gas leak can be detected rapidly, efficiently and accurately, and mistaken detection of a gas leak can be prevented, even when using an appliance which has been newly installed in a dwelling receiving a gas supply.

In order to achieve the aforementioned objects, the gas leak detection apparatus according to the present invention comprises: a flow volume measurement means for measuring the instantaneous flow volume of gas flowing inside a gas flow channel; a instantaneous flow volume time differential operation means for operating the time differential value of the instantaneous flow volume which has been measured by the flow volume measurement means; a characteristics extraction means for extracting the characteristics of the gas flow including the instantaneous flow volume and the time differential value of the instantaneous flow volume, on the basis of the instantaneous flow volume which has been measured by the flow volume measurement means and the time differential value of the instantaneous flow volume which has been operated by the instantaneous flow volume time differential operation means; a storage means for registering characteristics data indicating different gas flow characteristics for respective types of gas appliance or for a gas leak; a characteristics data registration means for registering in the storage means characteristics data indicating characteristics which have been extracted by the characteristics extraction means from a flow volume pattern in which the occurrence of a flow volume has been measured by the flow volume measurement means and the flow volume has subsequently become zero; and a leak detection means for performing leak detection in which the presence or absence of a gas leak is judged, and outputting a judgment result, by comparing the characteristics data which has been registered in the storage means with the characteristics of the gas flow which has been extracted by the characteristics extraction means; wherein the characteristics data registration means registers the characteristics of the gas flow forming the basis of a judgment as new characteristics data, in the storage means, when it is judged by the leak detection means that there is no gas leak.

Furthermore, in one mode of the present invention, the gas leak detection apparatus further comprises: a pressure measurement means for measuring the pressure of the gas flowing inside the gas flow channel; wherein the characteristics extraction means extracts characteristics of the gas flow including the relationship between the flow volume and the pressure, on the basis of the instantaneous flow volume which has been measured by the flow volume measurement means, the time differential value of the instantaneous flow volume which has been operated by the instantaneous flow volume time differential operation means, and the pressure which has been measured by the pressure measurement means.

Furthermore, the gas leak detection method according to the present invention states the functions of the gas leak detection apparatus described above, in terms of a method.

The present invention described above is devised by focusing on the fact that a flow volume pattern in which a flow volume occurs and then returns to zero relates not to a gas leak but rather to the use of an appliance, and when a flow volume pattern of this kind is newly extracted, then it is registered as characteristics data and is used in subsequent gas leak detection, thereby making it possible to prevent mistaken detection of a gas leak.

In the present invention, if the characteristics of a newly extracted flow volume pattern match the flow volume pattern of registered characteristics data, then this means that an appliance corresponding to that characteristics data is in use, and if they do not match, then it can be judged that there is a gas leak or that a new appliance is in use. Furthermore, if there is no matching, then it is judged whether or not there is a change in the flow volume or a change in the nozzle, on the basis of a combination of the instantaneous flow volume and the time differential value of the instantaneous flow volume, or the ratio between the flow volume and the square root of the pressure, and by this judgement, it can be determined accurately and rapidly whether there is a gas leak or whether an unregistered appliance is in use.

If there is a change in the flow volume or a change in the nozzle, then this means that there is an appliance which implements flow volume control of some kind, and therefore by registering the characteristics of this flow volume pattern as characteristics data for a new appliance, the characteristics can be used in subsequent detection and judgment of gas leaks. Furthermore, if there is no change in the flow volume or change in the nozzle, then there is a high probability of a gas leak and therefore it is possible to respond swiftly to a gas leak by issuing a warning.

According to the present invention, it is possible to provide a gas leak detection apparatus and method whereby mistaken detection of a gas leak can be prevented even when using an appliance which has been newly installed in a dwelling receiving a gas supply, and whereby a gas leak can be detected rapidly, efficiently and accurately.

DESCRIPTION OF THE PREFERRED EMBODIMENTS

Composition of Embodiment

Figure 1:
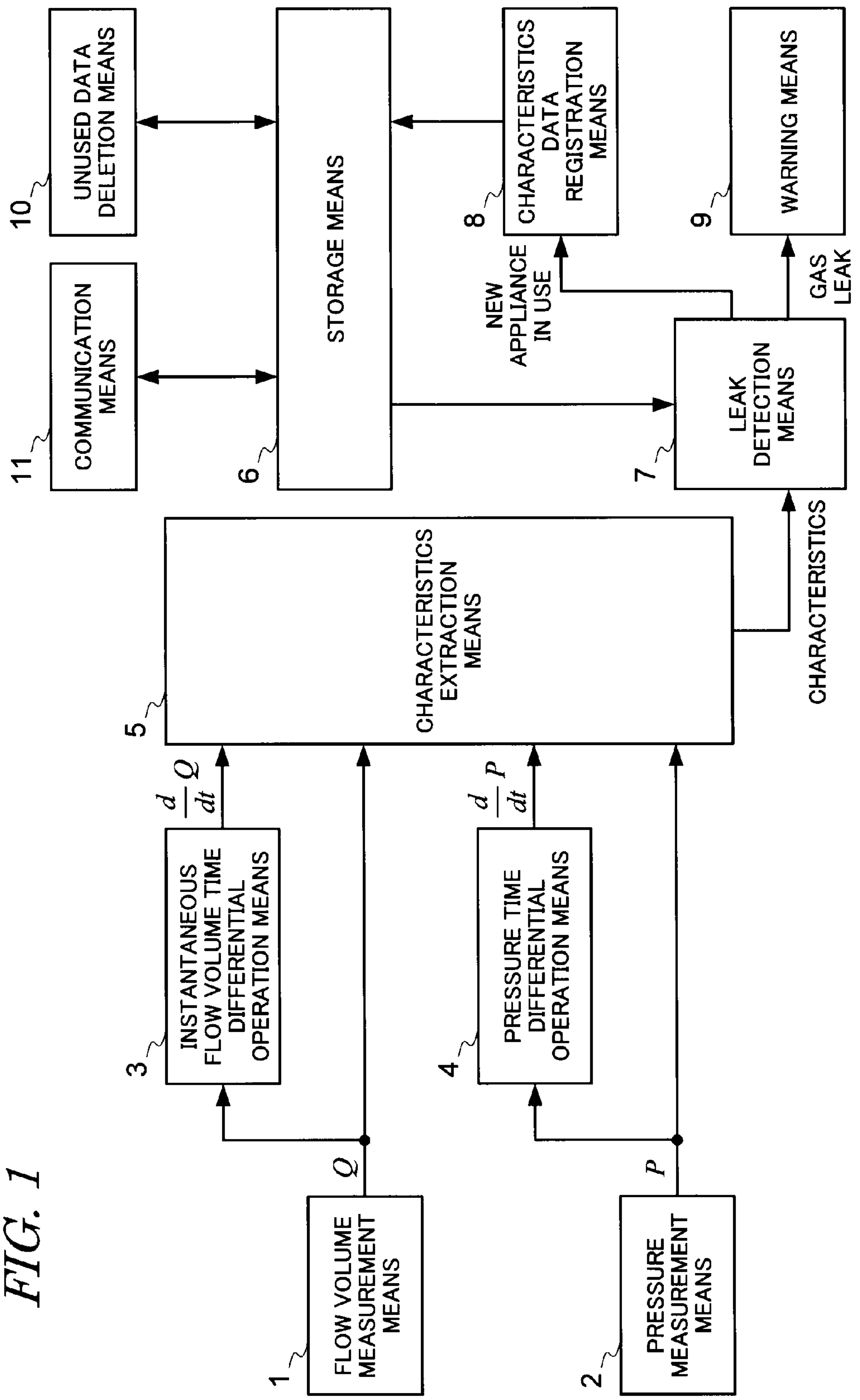
FIG. 1 is a functional block diagram showing the composition of a gas leak detection apparatus according to one embodiment to which the present invention is applied.

FIG. 1 is a functional block diagram showing the composition of a gas leak detection apparatus according to an embodiment to which the present invention has been applied. As shown in FIG. 1, the gas leak detection apparatus according to the present embodiment is composed of a flow volume measurement means 1, a pressure measurement means 2, an instantaneous flow volume time differential operation means 3, a pressure time differential operation means 4, a characteristics extraction means 5, a storage means 6, a leak detection means 7, a characteristics data registration means 8, warning means 9, an unused data deletion means 10 and a communication means 11. The details of the means 1 to 11 are as follows.

The flow volume measurement means 1 is a means for measuring the instantaneous flow volume Q of the gas flowing inside a gas supply flow channel (gas pipe). It is possible to use various types of measurement means for the flow volume measurement means 1, but in the present embodiment, it is supposed that an ultrasonic flow volume meter is used.

For example, this ultrasonic flow volume meter has a gas inflow port, a gas flow channel, a gas outflow port, a shut-off valve, a display unit and a control unit. Ultrasonic vibrating elements are provided inside the gas flow channel, respectively in the upstream portion and the downstream portion of the gas flow channel. An ultrasonic wave is transmitted and received repeatedly, in the forward direction and reverse direction of the flow respectively, between the ultrasonic vibrating element in the upstream portion and the ultrasonic vibrating element in the downstream portion, and the integral propagation time of the ultrasonic wave in either direction is determined. The instantaneous flow volume is calculated on the basis of the difference in propagation time thus obtained.

The pressure measurement means 2 is a means for measuring the pressure P of the gas flowing in a gas supply flow channel (gas pipe). It is possible to use various types of pressure meter and pressure sensor for this pressure measurement means 2.

The instantaneous flow volume time differential operation means 3 is connected to the flow volume measurement means 1, and operates the time differential value of the instantaneous flow volume data measured by the flow volume measurement means 1. The pressure time differential operation means 4 is connected to the pressure measurement means 2 and operates the time differential value of the pressure data measured by the pressure measurement means 2. These time differential operation means 3 and 4 can be achieved by a combination of an electronic circuit or computer, and a program specified for time differential operation.

Furthermore, the flow volume measurement means 1, the pressure measurement means 2, the instantaneous flow volume time differential operation means 3 and the pressure time differential operation means 4 are all connected to the characteristics extraction means 5, and the data obtained from these means 1 to 4, in other words, the instantaneous flow volume data and the instantaneous flow volume time differential value data, and the pressure data and the pressure time differential value data, are all inputted to the characteristics extraction means 5.

The characteristics extraction means 5 is a means for extracting characteristics of the gas flow which is flowing in a gas flow channel which is the object of judgment, on the basis of inputted instantaneous flow volume data and instantaneous flow volume time differential value data, and pressure data and pressure time differential value data.

Here, the instantaneous flow volume data measured by the flow volume measurement means 1, the instantaneous flow volume time differential value data obtained from same, and the pressure data measured at the same point in time and the pressure time differential value data obtained from same each has different characteristics for each type of gas appliance (or in the case of a gas leak). However, since there are also cases where any one of these data elements (for example, the instantaneous flow volume data alone) is the same for a plurality of different types of gas appliance, then it is difficult to judge the appliance accurately. Therefore, in the characteristics extraction means 5 according to the present embodiment, in addition to extracting the characteristics for each data type, the characteristics of a combination of a plurality of data types are also extracted, and hence it is possible to extract accurately the characteristics which differ between respective types of gas appliance.

This characteristics extraction means 5, and as described below, the leak detection means 7, the characteristics data registration means 8 and the unused data deletion means 10 can generally be achieved by a combination of electronic circuits or computers of various types, and programs specified in order to achieve the functions of these means.

Data composed of a plurality of items corresponding to the respective characteristics extracted by the characteristics extraction means 5 is previously registered in the storage means 6 in an initial stage before the start of operation of the gas leak detection apparatus, as characteristics data which indicates the characteristics which differ between such different types of gas appliance, and furthermore, new characteristics data can be additionally registered therein. This storage means 6 can be realized by various types of memory or storage unit.

The leak detection means 7 is a means for detecting the presence or absence of a gas leak by comparing the characteristics data for respective gas appliance types or for a gas leak which is registered in the storage means 6 with the characteristics of the gas flow which has been extracted by the characteristics extraction means 5.

The characteristics data registration means 8 is a means for registering the characteristics of the gas flow forming the basis of the judgment in the storage means 6 as new characteristics data, when it is judged by the leak detection means 7 that there is no gas leak or that an appliance is in use.

The warning means 9 is a means for outputting the judgment result in a form whereby it can be presented or reported to the human operator, when it is judged by the leak detection means 7 that there is a gas leak. In practice, this warning means 9 can be realized by various types of output means, such as an LCD or other display unit provided in a gas meter, an externally provided reporting unit, or a display monitor, printer or gas leak warning unit.

The unused data deletion means 10 is a means for deleting characteristics data having a use frequency not more than a prescribed level, as unused data, from the characteristics data registered in the storage means 6. In order to judge this use frequency, in the present embodiment, an indicator value showing the use frequency is registered additionally by the characteristics data registration means 8 in the characteristics data which is registered in the storage means 6.

The communication means 11 is a means for downloading or uploading the characteristics data registered in the storage means 6. This communication means 11 can be realized by a communication control unit installed in a computer or by various types of communication control means.

Overview of Gas Leak Detection Procedure

Figure 2:
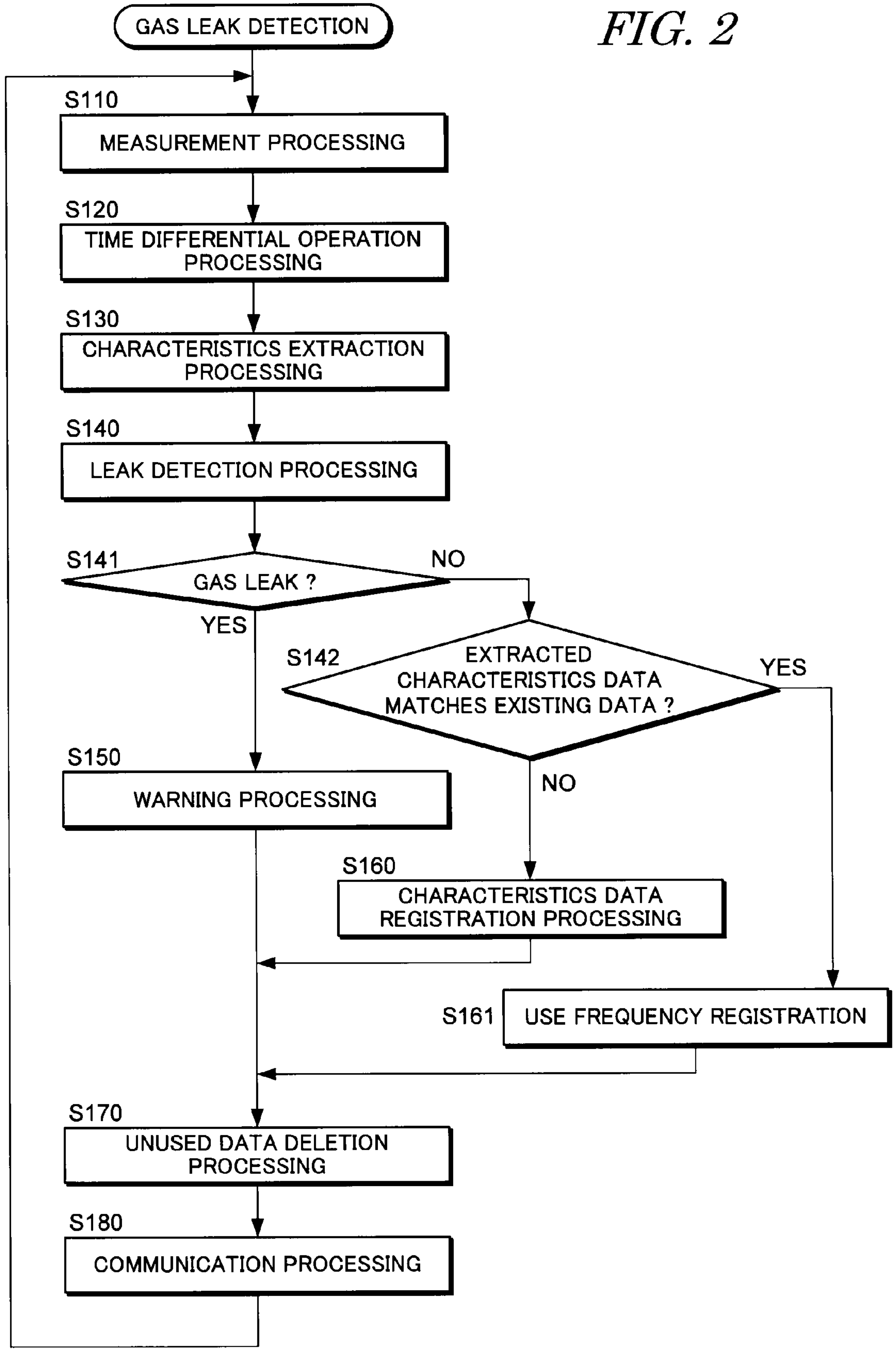
FIG. 2 is a flowchart showing one example of a gas leak detection procedure performed by the gas leak detection apparatus of the present embodiment.

FIG. 2 is a flowchart showing one example of a gas leak detection procedure performed by a gas leak detection apparatus according to the present embodiment. Below, the gas leak detection procedure performed by the gas leak detection apparatus of the present embodiment will be described with reference to FIG. 2.

As shown in FIG. 2, in the gas leak detection apparatus according to the present embodiment, in the flow volume measurement means 1 and the pressure measurement means 2, the instantaneous flow volume and pressure of the gas flowing inside the gas supply flow channel (gas pipe) are respectively measured constantly at a uniform sampling cycle (for example, two seconds in either case), and the instantaneous flow volume data Q and pressure data P thus measured are respectively supplied to the instantaneous flow volume time differential operation means 3 and the pressure time differential operation means 4 (S110: measurement processing).

In the instantaneous flow volume time differential operation means 3 and the pressure time differential operation means 4, the instantaneous flow volume time differential value (d/dt)Q and the pressure time differential value (d/dt)P are respectively operated from the measured instantaneous flow volume data Q and pressure data P (S120: time differential operation processing). The data obtained by the measurement means 1, 2 and the time differential operation means 3, 4, in other words, the instantaneous flow volume data and the instantaneous flow volume time differential value data, and the pressure data and the pressure time differential value data are supplied to the characteristics extraction means 5.

At each occurrence of a previously set characteristics extraction process timing, the characteristics extraction means 5 extracts the characteristics of the gas flow passing through the gas flow channel which is the object of judgment, on the basis of the acquired instantaneous flow volume data and instantaneous flow volume time differential value data, and the acquired pressure data and pressure time differential value data (S130: characteristics extraction processing).

In this characteristics extraction processing performed by the characteristics extraction means 5, firstly, the noise in the instantaneous flow volume data is removed, and the flow volume data which is to be the object of characteristics extraction is extracted from the instantaneous flow volume data after noise removal. The characteristics of the gas flow volume are then extracted on the basis of the extracted flow volume data, and the instantaneous flow volume time differential value and pressure value, and the like, corresponding to same.

The characteristics are extracted here for respective data types, such as the length (continuation time), initial flow volume, average value, gradient, standard deviation, and the like, in addition to which the characteristics of combinations of a plurality of data types are also extracted. In this case, various different combinations of a plurality of data types can be considered, but in the present embodiment, at least the characteristics of a combination of the instantaneous flow volume data and the instantaneous flow volume time differential value are extracted. More specifically, the “sequence of transited regions” is extracted as the characteristics of the combination of the instantaneous flow volume data and the instantaneous flow volume time differential value. This “sequence of transited regions” means the sequence of the regions which represent the temporal transitions when the instantaneous flow volume and the instantaneous flow volume time differential value are plotted on a two-dimensional graph and divided into regions.

Characteristics data which represents a plurality of characteristic elements, such as the length (continuation time), initial flow volume, average value, gradient, standard deviation, and sequence of transited regions, which have been obtained by the characteristics extraction processing performed by the characteristics extraction means 5, are supplied to the leak detection means 7.

The leak detection means 7 detects the presence or absence of a gas leak by comparing the characteristics data of the respective gas appliance types or the existence of a gas leak which is registered in the storage means 6 with the newly extracted characteristics data which has been extracted by the characteristics extraction means 5 (S140: leak detection processing). Further details of leak detection processing are described below. In the leak detection processing performed by the leak detection means 7, a judgment result is outputted to the warning means 9 when it is judged that there is a gas leak (YES in S141).

Furthermore, when it is judged by the leak detection means 7 that there is no gas leak (NO at S141) and if there is no data which matches the newly extracted characteristics data, in the existing characteristics data which has been registered by the storage means 6 (NO at S142), this means that the appliance in use is a new gas appliance which does not correspond to the existing characteristics data. In this case (NO at S142), the newly extracted characteristics data forming the basis of the judgment is supplied to the characteristics data registration means 8.

On the other hand, when it is judged by the leak detection means 7 that there is no gas leak (NO at S141) and if there is data which matches the newly extracted characteristics data in the existing characteristics data which has been registered in the storage means 6 (YES at S142), then the appliance in use is an appliance which corresponds to the existing characteristics data. In this case (YES at S142), a judgment result which indicates a matching with the existing characteristics data is supplied to the characteristics data registration means 8.

If the leak detection means 7 has judged that there is a gas leak (YES at S141), then the warning means 9 outputs an judgment result which indicates a gas leak in a form which can be presented or reported to a human operator, such as a display or print-out of a warning message, or a warning sound, or the like (S150: warning processing).

Upon receiving the newly extracted data which indicates a plurality of characteristic items, such as the length (continuation time), initial flow volume, average value, standard deviation and sequence of transited regions, from the leak detection means 7, (NO at S142), the characteristics data registration means 8 registers this newly extracted characteristics data in the storage means 6 as new characteristics data which corresponds to a new gas appliance type which has not yet been registered (S160: registration processing).

If a judgment result showing a matching with existing characteristics data has been received by the characteristics data registration means 8 (YES at S142), then either an indicator value which represents the use frequency is registered additionally in the existing characteristics data, or an additional indicator value which has already been registered is updated (S161: use frequency registration processing).

The unused data deletion means 10 carries out use frequency judgment with respect to the characteristics data which is registered in the storage means 6, at a previously set unused data judgment timing, such as when the characteristics data in the recording means 6 is updated or at a prescribed cycle, or when an unused data judgment instruction is issued, and if there is characteristics data having a use frequency not more than a prescribed level, then this data is deleted as unused data (S170: unused data deletion processing).

The communication means 11 downloads or uploads the characteristics data registered in the storage means 6, at a previously set communication timing, such as whenever the characteristics data in the storage means 6 is updated or at a prescribed cycle, of if a data download instruction of upload instruction has been issued (S180: communication processing). By carrying out communication processing of this kind, it becomes possible to exchange and use the characteristics data mutually, between the gas leak detection apparatus according to the present embodiment and other external apparatuses or systems.

Details of Gas Leak Detection Procedure

Below, a concrete example of the composition of the characteristics data used in the gas leak detection procedure shown in FIG. 2, and the details of the characteristics extraction processing (S130), the leak detection processing (S140) and unused data deletion processing (S170) corresponding to the characteristics data composition will be described.

Example of Composition of Characteristics Data

Figures 3, 4:
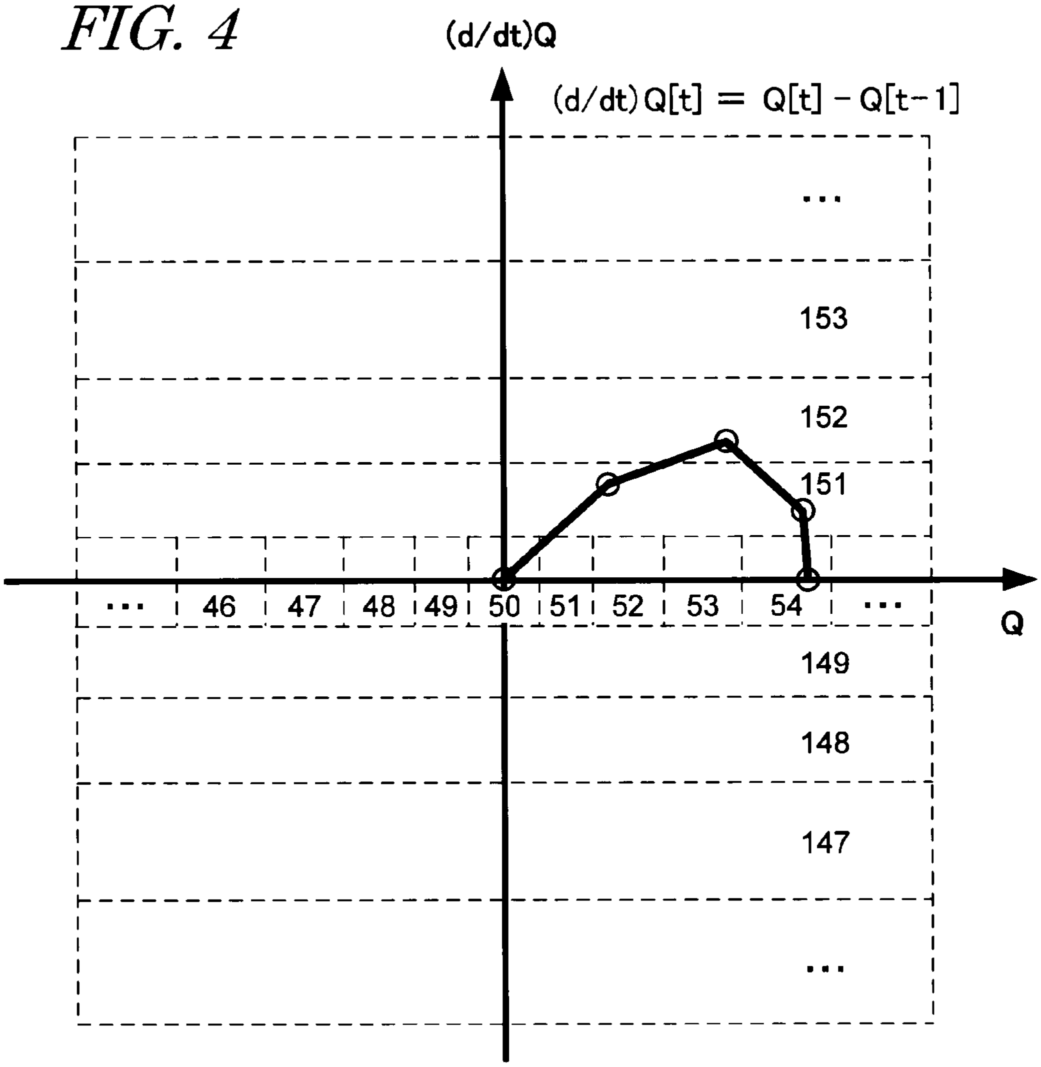
FIG. 3 is a diagram showing one example of the composition of characteristics data used in the present embodiment.
FIG. 4 is a diagram showing one example of a technique for extracting "the sequence of transited regions" of the variable portion of the flow volume, in the characteristics extraction processing according to the present embodiment.

FIG. 3 is a diagram showing one example of the data composition of the characteristics data used in the present embodiment. In this example, the respective characteristics data elements are treated as one rule, and continuous rule numbers are allocated successively. Items which indicate the characteristics, such as the length division, the initial flow volume, the transited regions, the average value, and the like, are associated with the respective rule numbers.

Here, the "length division" is a division number which indicates a division obtained by dividing the assumed range of the length of the continuation time into a plurality of divisions. The "transited regions" are region numbers which indicate the transitions of the instantaneous flow volume Q and the instantaneous flow volume time differential value (d/dt)Q in a case where the X-Y plane of the instantaneous flow volume Q and the instantaneous flow volume time differential value (d/dt)Q shown in FIG. 4 is divided into regions and a unique region number is assigned respectively to identify each of the divided regions. The "initial flow volume" is the flow volume at the start point of the continuation time, and the "average value" is the average flow volume of the instantaneous flow volume during the length of the continuation time.

Moreover, in addition to these characteristic items, the last matching and frequency items are provided as indicator values which indicate the use frequency. For example, the "last matching" states the number of days which have elapsed since the last date and time that a matching was achieved by comparison with the newly extracted characteristics data in the leak detection processing, and the "frequency" states the number of times that a matching has been achieved in the past.

Example of Characteristics Extraction Processing

As stated above, in the characteristics extraction processing (S130 in FIG. 2) which is performed by the characteristics extraction means 5, the "sequence of transited regions" is extracted as the characteristics of the combination of the instantaneous flow volume data and the instantaneous flow volume time differential value. As shown in FIG. 4, the technique of extracting the "sequence of transited regions" involves, for example, assigning the instantaneous flow volume Q and the time differential value of the instantaneous flow volume (d/dt)Q (=Q[t]−Q[t−1]) to the X axis and Y axis, and plotting the temporal change, and thereby extracting the regions occupied by both data values, or extracting the sequence of regions which indicate the temporal transition of both data in the X-Y plane.

In the example shown in FIG. 4, if the X-Y plane is divided into regions and a unique region number is assigned to identify each of the respective divided regions, then the regions numbers which represent the "sequence of transited regions" are extracted by determining the transition of the instantaneous flow volume Q and the instantaneous flow volume time differential value (d/dt)Q.

As shown in FIG. 4, in dividing the regions, it is possible to ascertain the initial flow volume or the flow volume during steady combustion in a detailed fashion, by dividing the portion where the instantaneous flow volume time differential value (d/dt)Q is close to zero into fine divisions on the basis of the value of the instantaneous flow volume Q. In other words, the initial flow volume or the average flow volume during safe combustion have characteristics which correspond to the type of gas appliance and therefore it is possible to extract these characteristics accurately by dividing only the portion where (d/dt)Q is close to zero into fine division on the basis of the value of Q.

Furthermore, in the case of a proportionately controlled apparatus such as a fan heater, the amount of combustion is controlled in a stepwise fashion from maximum combustion until steady combustion, and therefore it is possible to extract the characteristics of the transitions of the amount of combustion accurately by dividing only the portion where (d/dt)Q is close to zero into fine divisions on the basis of the value of Q as shown in FIG. 4.

In the example shown in FIG. 4, consecutive region numbers in double figures such as "46" to "54" are assigned to the plurality of regions of the portion where the time differential value of the instantaneous flow volume (d/dt)Q is close to zero, and consecutive region numbers in three figures such as "149" to "147" and "151" to "153" are assigned to the regions on either side of these regions, where the time differential value of the instantaneous flow volume (d/dt)Q is on the negative side or positive side. In the example shown in FIG. 4, if the sequence of region numbers is extracted as the "sequence of transited regions" indicated by the bold line, then the sequence "50, 151, 152, 151, 54" is obtained.

One Example of Leak Detection Processing

Figure 5:
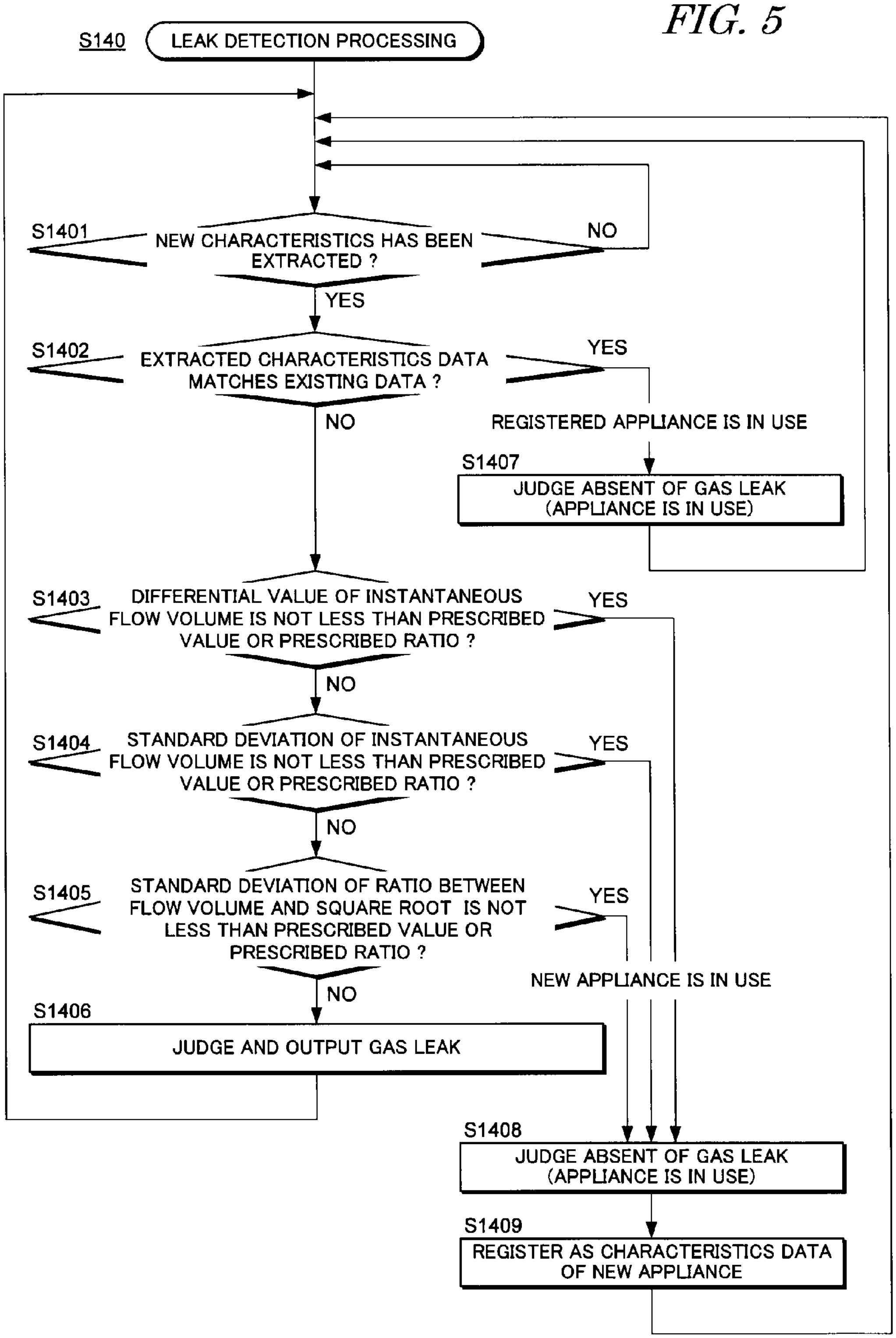
FIG. 5 is a flowchart showing one example of leak detection processing according to the present embodiment.

In the leak detection processing (S140 in FIG. 2) performed by the leak detection means 7, as stated previously, the presence or absence of a gas leak is detected by comparing the characteristics data for respective gas appliance types or the occurrence of a gas leak which are registered in the storage means 6 with the characteristics of the gas flow which have been extracted by the characteristics extraction means 5. FIG. 5 is a flowchart showing one example of leak detection processing (S140) which is performed by the leak detection means 7.

As shown in FIG. 5, if characteristics data which indicates new characteristics extracted by the characteristics extraction means 5 has been received by the leak detection means 7 (YES at S1401), then firstly, the existing characteristics data registered in the storage means 6 is searched to discover whether or not characteristics data which matches the newly extracted characteristics data is present therein (S1402).

If there is no characteristics data which matches the newly extracted characteristics data in the existing characteristics data (NO at S1402), then this means at the least that a gas appliance corresponding to the existing characteristics data is not in use, but in this case, moreover, it is judged whether or not the instantaneous flow volume time differential value in the newly extracted characteristics data is not less than a prescribed value or not less than a prescribed ratio, in other words, whether or not the change in the flow volume is not less than a prescribed level (S1403). In the present specification, the "prescribed value", "threshold value" and "prescribed ratio" mean various boundary values or reference values which are previously established as range limits or for use in comparison and judgment. These boundary values can be included in either of higher and lower ranges which are divided by the respective values, but in the present embodiment, merely as one example, these values are included in respective higher ranges.

If the time differential value of the instantaneous flow volume in the newly extracted characteristics data is less than a prescribed value or less than a prescribed ratio, and the change in the flow volume is less than a prescribed level (NO at S1403), then it is furthermore judged whether or not the standard deviation of the instantaneous flow volume in the newly extracted characteristics data is not less than the prescribed value or is not less than a prescribed ratio, in other words, if the dispersion in the flow volume is not less than a prescribed level (S1404).

If the standard deviation of the instantaneous flow volume in the newly extracted characteristics data is less than the prescribed value or less than the prescribed ratio, and the dispersion in the flow volume is less than the prescribed level (NO in S1404), then it is further judged whether or not the standard deviation of the ratio between the instantaneous flow volume and the square root of the pressure in the newly extracted characteristics data is not less than a prescribed value or is not less than a prescribed ratio (S1405). In other words, if the ratio between the flow volume and the square root of the pressure is determined, then this value corresponds to the amount of opening of the gas spray nozzle section of the gas appliance, and therefore it is possible to judge whether or not the nozzle dispersion is not less than a prescribed level by determining the standard deviation in the ratio between the flow volume and the square root of the pressure.

If the standard deviation in the ratio between the instantaneous flow volume and the square root of the pressure in the newly extracted characteristics data is less than a prescribed value or less than a prescribed ratio, and the nozzle dispersion is less than the prescribed level (NO at S1405), then it is judged that there is a gas leak and this judgment result is outputted to the warning means 9 (S1406).

Furthermore, if there is characteristics data in the existing characteristics data which matches the newly extracted characteristics data (YES at S142), then this means that a gas appliance corresponding to this characteristics data is in use and hence there is no gas leak. Accordingly, it is judged that there is no gas leak or that an appliance is in use (S1407).

On the other hand, if the time differential value of the instantaneous flow volume in the newly extracted characteristics data is not less than a prescribed value or not less than a prescribed ratio (YES at S1403), or the standard deviation of the instantaneous flow volume is not less than a prescribed value or not less than a prescribed ratio (YES at S1404), or the standard deviation of the ratio between the instantaneous flow volume and the square root of the pressure is not less than a prescribed value or not less than a prescribed ratio (YES at S1405), in any of these cases, then there is no gas leak and a new gas appliance which does not correspond to existing characteristics data is in use. Therefore, it is judged that there is no gas leak or that an appliance is in use (S1408). In this case, the newly extracted characteristics data is supplied to the characteristics data registration means 8 and is registered as characteristics data for a new appliance (S1409).

According to the leak detection processing described above, if the newly extracted characteristics data does not match the existing characteristics data which is registered in the storage means 6, then it is only judged that there is a gas leak if the change in the flow volume, the dispersion in the flow volume, and the nozzle dispersion are each not more than a prescribed level, and therefore it is possible to judge the presence and absence of a gas leak in an accurate fashion.

Example of Unused Data Deletion Processing

In the unused data deletion processing which is performed by the unused data deletion means 10 (S170 in FIG. 2), as stated previously, characteristics data having a use frequency which is not more than a prescribed level is deleted as unused data from the characteristics data registered in the storage means 6.

When the composition of the characteristics data shown in FIG. 3 is used, if the "number of elapsed days from the date and time of last matching" supplied as the "last matching" of the characteristics data is not less than a prescribed value, or if the "number of past matchings" supplied as the "frequency" is not more than a prescribed value, then the newly judged characteristics data is deleted as unused data. As a modification example, it is also possible to delete characteristics data as unused data on the basis of both of these indicators, in other words, if the "number of elapsed days from the date and time of last matching" has become not less than the prescribed value for itself and if the "number of past matchings" has become not more than the prescribed value for itself.

By carrying out unused data deletion processing of this kind, it is possible mechanically to delete characteristics data having a use frequency which is not more than a prescribed level, and therefore it is possible to prevent unnecessary registration and accumulation of unwanted characteristics data. Accordingly, it is possible to prevent situations, such as insufficient capacity of the storage means due to the accumulation of unwanted characteristics data, or decline in the characteristics data search speed during the leak detection process as a result of increase in the volume of characteristics data. Moreover, as an adaptation example, it is also possible to deal with characteristics data such that basic data, which is characteristics data which has been prepared in advance in an initial stage before the start of operation of the gas leak detection apparatus is not deleted, but rather only the characteristics data which has been registered newly after the start of operation is taken as an object for deletion.

Advantageous Effects of the Embodiment

According to the embodiments described above, advantageous effects of the following kind are obtained.

Figure 6:
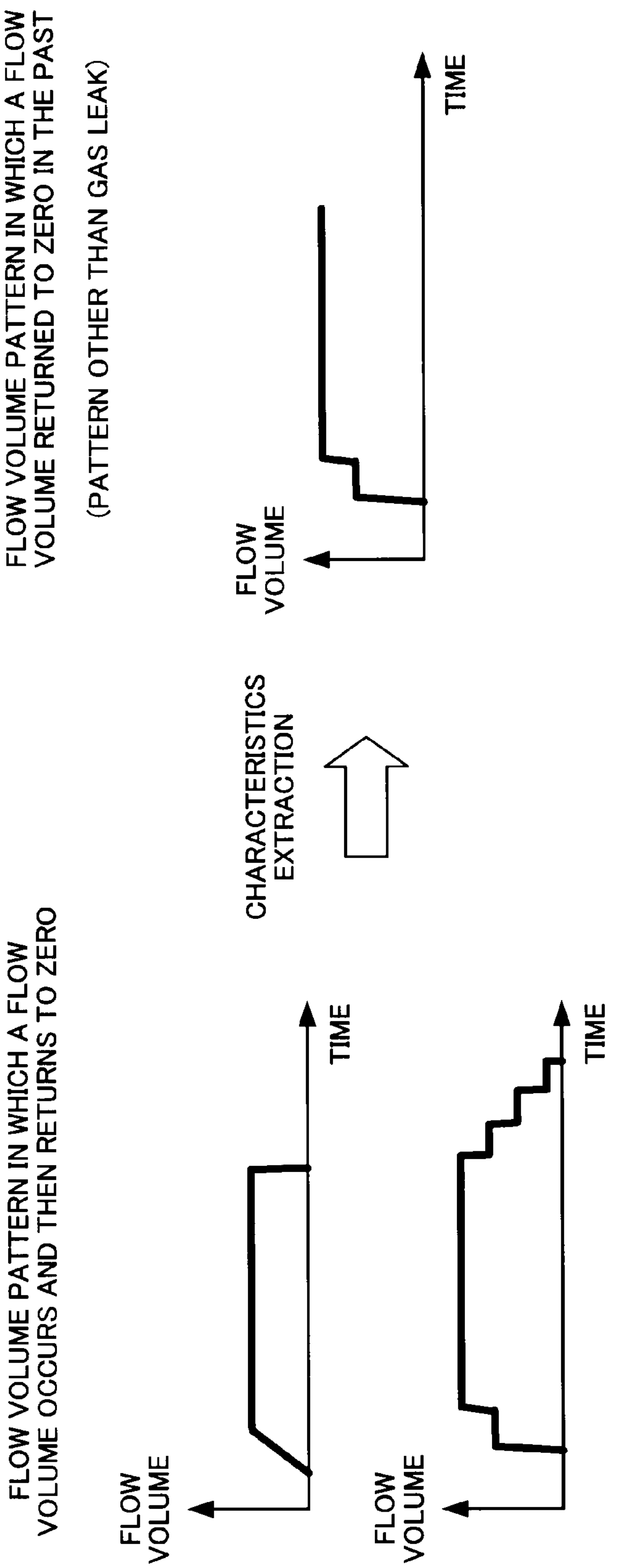
FIG. 6 is a diagram showing one example of the extraction and registration of a flow volume pattern according to the gas leak detection procedure according to the present embodiment.
Figure 7:
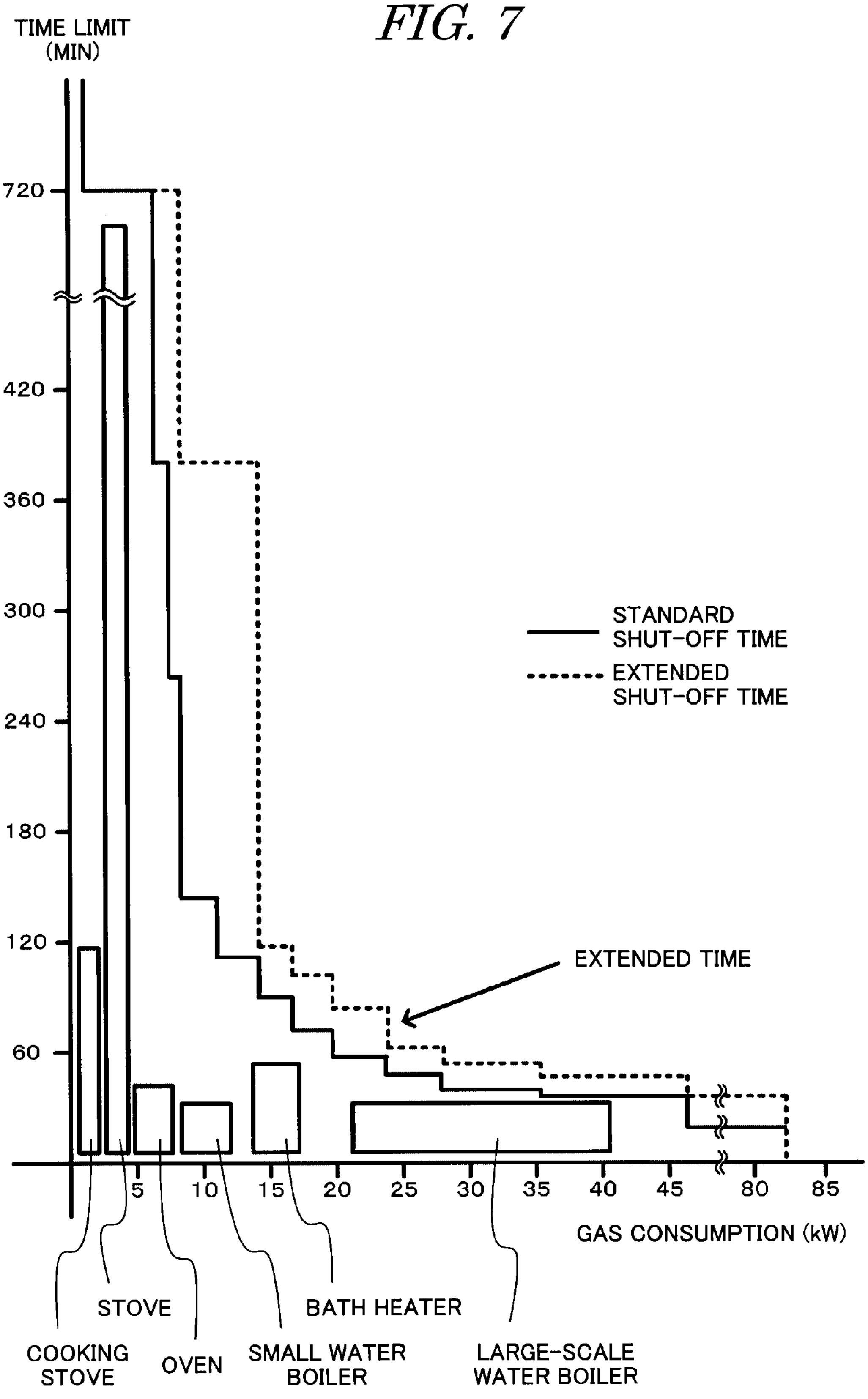
FIG. 7 is a diagram showing time limit settings which are used to judge over-run of the safe continuous use time.

Firstly, as stated above, the present invention is premised on the fact that a flow volume pattern in which a flow volume occurs and then returns to a zero flow volume relates not a gas leak but rather to an appliance in use, and if a new flow volume pattern of this kind is extracted, this is registered as characteristics data and is used for subsequent gas leak detection. For example, the flow volume pattern such as that shown in FIG. 6 is registered and used. Consequently, in the leak detection processing, it is important to detect accurately whether the extracted flow volume pattern corresponds to a gas leak or to the use of an appliance which has not been registered.

On the other hand, in the present embodiment, firstly, if the characteristics of a newly extracted flow volume pattern matches the flow volume pattern of registered characteristics data, then it can be judged that an appliance corresponding to the characteristics data is in use, and it if does not match, then it can be judged that there is a gas leak or that a new appliance is in use. Furthermore, if it does not match, then it is judged whether or not there is a flow volume variation or nozzle variation, on the basis of the combination of the instantaneous flow volume and the time differential value of the instantaneous flow volume and the ratio between the flow volume and the square root of the pressure, and this results in that it can be detected rapidly and accurately whether there is a gas leak or whether an unregistered appliance is in use.

If there is a flow volume variation or nozzle variation, then this means that there is an appliance which implements flow volume control of some kind, and therefore by registering the characteristics of this flow volume pattern as characteristics data for a new appliance, these characteristics can be used in subsequent detection and judgment of gas leaks. Furthermore, if there is no flow volume variation or nozzle variation, then there is a high probability of a gas leak and therefore it is possible to respond swiftly to a gas leak by issuing a warning.

In particular, in the present embodiment, leak detection is carried out by determining the ratio between the flow volume and the square root of the pressure, and therefore it is possible to judge accurately the presence of a governor. As stated previously, since the ratio of the flow volume and the square root of the pressure corresponds to the amount of opening of the gas spray nozzle section of the gas appliance, if the amount of opening of the gas spray nozzle is altered in response to pressure change so as to maintain a uniform flow volume, it can be judged that there is a governor, and if the amount of opening of the gas spray nozzle is uniform and the flow volume changes, it can be judged that there is no governor.

If no governor is present, then either there is a gas appliance which is not fitted with a governor, such as a cooking stove, or there is a gas leak, and a governor is present, then there is a gas appliance which is fitted with a governor, such as a fan heater. Consequently, it can be judged accurately between a gas leak or a cooking stove which requires the gas supply to be shut off especially by a safety function, and an appliance such as a fan heater, in which it is necessary to prevent unwanted shut-off. Therefore, it is possible to prevent mistaken shut-off in the case of prolonged use of a gas appliance which is fitted with a governor, such as a fan heater.

Furthermore, since it is possible to judge the start-up point and the switch-off point of the gas appliance, on the basis of the ratio between the flow volume and the square root of the pressure, or a substitute value, then it is possible to judge efficiently and accurately between the occurrence of a gas leak and the continued use of a gas appliance which is not fitted with a governor. In relation to this, it is also possible to measure the continuous use time of the gas appliance, and therefore an operation for issuing a suitable warning in respect of the prolonged use of a gas appliance, or the like, becomes possible.

If the gas pressure change is relatively small, then the pressure value itself is used as a substitute value for the square root of the pressure, and the presence of a governor can be judged with little error, simply by determining the ratio between the flow volume and the pressure. If the presence of a governor is judged by determining the ratio between the flow volume and the pressure in this way, then the calculational load can be reduced in comparison with a case where the ratio between the flow volume and the square root of the pressure is determined, and therefore the efficiency can be improved. On the other hand, if the variation in the gas pressure is relatively large, then better accuracy can be achieved by finding the ratio between the flow volume and the square root of the pressure.

Consequently, according to the present embodiment, it is possible to provide a gas leak detection apparatus and method whereby mistaken detection of a gas leak can be prevented, even when using an appliance which has been newly fitted in a dwelling receiving a gas supply, and whereby a gas leak can be detected rapidly, efficiently and accurately. Furthermore, it is also possible to judge accurately and efficiently the presence or absence of a governor in use, and it is also possible to judge efficiently and accurately between the occurrence of a gas leak and the continuous use of a gas appliance which is not fitted with a governor.

Other Embodiments

The present invention is not limited to the embodiments described above and various other modifications are possible, within the scope of the invention. Firstly, the composition of the apparatus indicated in the present embodiment is merely an example, and the concrete composition of the apparatus and the composition of the respective means can be selected freely, in which case the concrete processing procedure and the details of the respective processings can also be selected freely in accordance with same.

For example, in the present embodiment, the pressure is measured and the presence of a nozzle variation can be judged by determining the ratio between the flow volume and the square root of the pressure, but as a modification example, it is also possible to obtain the advantageous effects of the present invention simply by judging the presence or absence of a flow volume variation by determining the combination of characteristics of the instantaneous flow volume and the time differential value of the instantaneous flow volume. In this case, the comparison and judgment of pressure-related data is omitted from the leak detection processing.

In relation to this, in the leak detection processing, the actual processing other than the comparison between newly extracted characteristics data and registered characteristics data can be modified appropriately. For instance, in the leak detection processing, it is possible to judge that there is a gas leak after a prescribed period of time, if the extracted characteristics of the gas flow do not match any of the registered characteristics data, and in this case also, the advantageous effects of the present invention are obtained.

Furthermore, in the present embodiment, a case was described in which previously prepared characteristics data has been registered in the storage means in an initial stage before the start of operation of the gas leak detection apparatus, but the present invention may also be applied to a case where characteristics data is not prepared in an initial stage. In this case, for example, an operational procedure is adopted whereby a prescribed data accumulation time (for example, 10 days) is established in an initial stage, and during this prescribed time period, characteristics are extracted and characteristics data is registered so as to accumulate a certain amount of characteristics data, whereupon the gas leak detection judgment is commenced.

What is claimed is:

1. A gas leak detection apparatus, comprising:

a flow volume measurement means for measuring the instantaneous flow volume of gas flowing inside a gas flow channel;

a instantaneous flow volume time differential operation means for operating the time differential value of the instantaneous flow volume which has been measured by the flow volume measurement means;

a characteristics extraction means for extracting the characteristics of the gas flow including a region data in which a plurality of combinations of the instantaneous flow volume and the time differential value of the instantaneous flow volume are plotted on a two-dimensional graph, on the basis of the instantaneous flow volume which has been measured by the flow volume measurement means and the time differential value of the instantaneous flow volume which has been operated by the instantaneous flow volume time differential operation means;

a storage means for registering characteristics data that includes the region data indicating different gas flow characteristics for respective types of gas appliance or for a gas leak;

a characteristics data registration means for registering in the storage means characteristics data that includes the region data indicating characteristics which have been extracted by the characteristics extraction means from a flow volume pattern in which the occurrence of a flow volume has been measured by the flow volume measurement means and the flow volume has subsequently become zero; and a leak detection means for performing leak detection in which the presence or absence of a gas leak is judged, and outputting a judgment result, by comparing the characteristics data which has been registered in the storage means with the characteristics of the gas flow which has been extracted by the characteristics extraction means;

wherein the leak detection means compares the region data of the characteristics data which has been registered in the storage means with the region data of the characteristics of the gas flow which has been extracted by the characteristics extraction means, judges as to whether there is a characteristics data that matches the region data of the extracted characteristics on the gas flow, and if there is no characteristics data that satisfies the matching, judges the level of a measured value or an operated value included in the characteristics of the extracted characteristics on the gas flow to judge as to whether there is a gas leak, and wherein the characteristics data registration means registers the characteristics of the gas flow forming the basis of a judgment as new characteristics data, in the storage means, when it has been judged by the leak detection means that there is no gas leak as a result of the level judgment performed by the leak detection means.

2. A gas leak detection apparatus according to claim 1, wherein:

the characteristics extraction means represents the instantaneous flow volume measured by the flow volume measurement means and the time differential value of the instantaneous flow volume operated by the instantaneous flow volume time differential operation means on a two-dimensional graph, and divides same into regions, and extracts the transitions of the instantaneous flow volume and the time differential value of the instantaneous flow volume which move in a time sequence within the divided regions;

the characteristics data registration means registers characteristics data indicating the transitions in accordance with a time sequence of the instantaneous flow volume and the time differential value of the instantaneous flow volume for respective types of gas appliance in the storage means; and the leak detection means judges the type of a gas appliance by comparing the transitions in accordance with a time sequence of the instantaneous flow volume and the time differential value of the instantaneous flow volume extracted by the characteristics extraction means with the transitions in accordance with a time sequence in the characteristics data for respective types of gas appliance registered in the storage means.

3. A gas leak detection apparatus according to claim 1, wherein:

the characteristics extraction means extracts the average flow volume and standard deviation of the instantaneous flow volume if the time differential value of the instantaneous flow volume operated by the instantaneous flow volume time differential operation means is not more than a prescribed value and not more than a prescribed ratio;

the characteristics data registration means registers characteristics data indicating the average flow volume and standard deviation of the instantaneous flow volume for respective types of gas appliance in the storage means; and the leak detection means judges the type of a gas appliance by comparing the average flow volume and standard deviation of the instantaneous flow volume extracted by the characteristics extraction means with the average flow volume and standard deviation of the instantaneous flow volume in the characteristics data for respective types of gas appliance registered in the storage means.

4. A gas leak detection apparatus according to claim 1, wherein:

the leak detection means judges that there is no gas leak or that an appliance in use and outputs same if the time differential value of the instantaneous flow volume operated by the instantaneous flow volume time differential operation means is not less than a prescribed value or not less than a prescribed ratio.

5. A gas leak detection apparatus according to claim 1, wherein:

the leak detection means judges that there is no gas leak or that an appliance in use and outputs same if the standard deviation of the instantaneous flow volume measured by the flow volume measurement means is not less than a prescribed value or not less than a prescribed ratio.

6. A gas leak detection apparatus according to claim 1, wherein:

the leak detection means judges that there is a gas leak after a prescribed period of time and outputs same if the characteristics of the gas flow extracted by the characteristics extraction means do not match any of the characteristics data registered in the storage means.

7. A gas leak detection apparatus according to claim 1, wherein:

the leak detection means judges that there is a gas leak and outputs same, if all of the conditions are satisfied as follows:

the time differential value of the instantaneous flow volume operated by the instantaneous flow volume time differential operation means is not more than a prescribed value and not more than a prescribed ratio;

the standard deviation of the instantaneous flow volume measured by the flow volume measurement means is not more than a prescribed value and not more than a prescribed ratio; and the characteristics of the gas flow extracted by the characteristics extraction means do not match any of the characteristics data registered in the storage means.

8. A gas leak detection apparatus according to claim 1, further comprising:

a pressure measurement means for measuring the pressure of the gas flowing inside the gas flow channel;

wherein the characteristics extraction means extracts characteristics of the gas flow including the relationship between the flow volume and the pressure, on the basis of the instantaneous flow volume which has been measured by the flow volume measurement means, the time differential value of the instantaneous flow volume which has been operated by the instantaneous flow volume time differential operation means, and the pressure which has been measured by the pressure measurement means.

9. A gas leak detection apparatus according to claim 8, further comprising:

a pressure time differential operation means for operating the time differential value of the pressure which has been measured by the pressure measurement means;

wherein the characteristics extraction means extracts characteristics of the gas flow including the relationship between the flow volume and the pressure, on the basis of the instantaneous flow volume which has been measured by the flow volume measurement means, the time differential value of the instantaneous flow volume which has been operated by the instantaneous flow volume time differential operation means, and the time differential value of the pressure which has been operated by the pressure time differential operation means.

10. A gas leak detection apparatus according to claim 8, wherein:

the leak detection means judges that there is a gas leak and outputs same, if all of the conditions are satisfied as follows:

the time differential value of the instantaneous flow volume operated by the instantaneous flow volume time differential operation means is not more than a prescribed value and not more than a prescribed ratio;

the standard deviation of the instantaneous flow volume measured by the flow volume measurement means is not more than a prescribed value and not more than a prescribed ratio;

the standard deviation of the ratio between the instantaneous flow volume measured by the flow volume measurement means and the square root of the pressure measured by the pressure measurement means, or the standard deviation of the ratio between the instantaneous flow volume and the pressure is not more than a prescribed value and not more than a prescribed ratio; and the characteristics of the gas flow extracted by the characteristics extraction means do not match any of the characteristics data registered in the storage means.

11. A gas leak detection apparatus according to claim 1, further comprising:

an unused data deletion means for deleting characteristics data having a use frequency which is not more than a prescribed level as unused data from the characteristics data registered in the storage means;

wherein the characteristics data registration means registers as an indicator which indicates the use frequency, the last date and time or the number of times that a matching has been achieved with accompanying the characteristics data for respective types of gas appliance in the storage means, when comparison by the leak detection means in relation to the characteristics of the gas flow extracted by the characteristics extraction means; and the unused data deletion means deletes characteristics data as unused data, if the elapsed period from the date and time of last matching is not less than a prescribed period or the number of matching is not more than a prescribed value, on the basis of the number of matching or the date and time of last matching which accompanies the characteristics data, from the characteristics data registered in the storage means.

12. A gas leak detection apparatus according to claim 1, further comprising:

a communication means for downloading or uploading the characteristics data registered in the storage means.

13. A gas leak detection method, comprising the steps of:

a flow volume measurement step for measuring the instantaneous flow volume of gas flowing inside a gas flow channel;

a instantaneous flow volume time differential operation step for operating the time differential value of the instantaneous flow volume which has been measured by the flow volume measurement step;

a characteristics extraction step for extracting the characteristics of the gas flow including a region data in which a plurality of combinations of the instantaneous flow volume and the time differential value of the instantaneous flow volume are plotted on a two-dimensional graph, on the basis of the instantaneous flow volume which has been measured by the flow volume measurement step and the time differential value of the instantaneous flow volume which has been operated by the instantaneous flow volume time differential operation step;

a characteristics data registration step for registering in a storage means characteristics data that includes the region data indicating characteristics which have been extracted by the characteristics extraction step from a flow volume pattern in which the occurrence of a flow volume has been measured by the flow volume measurement step and the flow volume has subsequently become zero; and a leak detection step for performing leak detection in which the presence or absence of a gas leak is judged, and outputting a judgment result, by comparing the characteristics data which has been registered in the storage means with the characteristics of the gas flow which has been extracted by the characteristics extraction step;

wherein the leak detection step includes comparing the region data of the characteristics data which has been registered in the storage means with the region data of the characteristics of the gas flow which has been extracted by the characteristics extraction step, judging as to whether there is a characteristics data that matches the region data of the extracted characteristics on the gas flow, and if there is no characteristics data that satisfies the matching, then judging the level of a measured value or an operated value included in the characteristics of the extracted characteristics on the gas flow to judge as to whether there is a gas leak, and wherein the characteristics data registration step includes registering the characteristics of the gas flow forming the basis of a judgment as new characteristics data, in the storage means, when it has been judged by the leak detection step that there is no gas leak as a result of the level judgment by the leak detection step.

* * * * *